Patented May 27, 1930

1,759,913

UNITED STATES PATENT OFFICE

FRANZ RUDOLF MOSER, OF BUSSUM, NETHERLANDS

PROCESS OF TREATING DISPERSIONS

No Drawing. Application filed July 27, 1925, Serial No. 46,510, and in the Netherlands January 2, 1925.

My invention relates to a process for preparing solids or liquids, such as asphalt, tar, pitch, fats, oils, resins, waxes, paraffine and similar substances in finely divided condition.

Various processes are known for bringing asphalt, tar, pitch, fats, oils, resins, waxes, paraffine and similar substances into finely divided condition, for instance into the form of an emulsion. These processes however have the drawback that the products obtained are either extremely sensitive to coagulating influences or that the division of the said material is not sufficiently equal and fine.

I have found that the said products may be brought into a finely divided condition which at the same time resists coagulating influences, if they are first emulsified by any known method, and then are treated in such a way that no lumps or layers are formed and so that the treated emulsion resists coagulating influences.

It is known that in the coagulation of suspensions and emulsions by the aid of electrolytes the separate particles of the disperse phase need not immediately flow together to a compact mass. The effect may be so produced that the dispersed particles are separated apart or combined to flaky aggregates, without, however, flowing together. This effect takes place especially, if the emulsion at a sufficient dilution, at not too high a temperature and with much stirring is treated with suitable solutions of an electrolyte, in the presence of finely divided substances, and this treatment of emulsions of the above kind forms the subject matter of my present patent application. The product obtained according to my invention from emulsions by the treatment aforesaid, avoiding lumps and maintaining as much as possible the emulsion particles present in the same state of division as in the original emulsion, will be referred to below as a "gel."

I have found that such gels may easily be obtained if the treatment of the emulsion takes place in the presence of finely divided or colloidal substances, such as protective colloids e. g. proteins, soaps, gums, humus substances, carbohydrates, tanning materials and other organic materials and compounds of different kinds. Inorganic substances also may be used, e. g. such of a slimy nature as for instance clay, silicic acid, aluminium hydroxide, iron hydroxide, and also crystalline materials such as sulphate of barium, magnesium oxide, carbonate of calcium and the like. As the chemical nature of the materials used is immaterial the same may be chosen in accordance with the purpose for which the gels are to be used. The addition of the finely divided substances may take place before or during the treatment with electrolyte. One may also proceed in such a way that by the aid of the electrolyte a precipitate is formed at the same time in the emulsion for instance by chemical reaction. The influence of the finely divided substances is most probably due to the enveloping action by which the finely divided substances prevents the coalescence of the asphalt particles. The use of finely divided substances in the treatment has the considerable advantage that more concentrated emulsions may be worked. In this way what I have termed gels may be obtained from asphalt containing more than 50% asphalt. I use the term "gel" hereinafter in order to distinguish the final product from the untreated dispersion.

In choosing the finely divided materials present at the treatment with electrolyte and in varying the amount thereof one may alter the properties of the gels to be obtained, such as for instance the viscosity; therefore, gels may be obtained the properties, as for example the viscosity of which, may vary between that of a liquid and that of a so-called jelly.

In order to elucidate my invention asphalt gel will be referred to as an example.

The asphalt gel obtained according to my invention is a new form of asphalt which shows properties of much value. The asphalt, being present in the form in which it is finely divided and proof against coagulating influences, is especially suitably fit for preparing intimate mixtures of asphalt with other substances. Also "hard" water may be added without any danger of coagulation. So, the asphalt gel may immediately be applied by combining the gel with solutions of chloride of magnesium, sulphite lye, waterglass and the like, which are used for the prevention of dust on roads. Also semi-solid substances, such as cement paste, lime-milk or paper paste may be mixed very well with the asphalt in the form of my new gel without forming lumps. In preparing asphalt paper one may add the gel at once to the paper bray. Special advantages are obtained by my asphalt gel in the preparation of mixtures of asphalt with powdery or granulated substances, as e. g. comminuted slags, stone powder and the like. The prepared mixtures contain the asphalt in such a state of subdivision that it does neither adhere nor form lumps, and may be stored in mixed condition.

By means of the asphalt gel it is further possible to prepare mixtures of asphalt and substances such as stone meal, ground slags and the like, which mixtures may be dried without baking or caking together due to the perfect division of the asphalt. Such mixtures may be easily stored and kept in a condition ready for use and only require cold stamping or rolling after being applied to roads.

Further, it is possible to use in preparing the gels substances which one wishes to add as fillers.

Example 1000 kg. of petroleum asphalt are emulsified in a known way so that an asphalt emulsion with a percentage of water of 50% is obtained, for instance in such a way that the asphalt in a liquid or dissolved condition is emulsified in the same amount of water containing an emulsifier such as for instance soap. This emulsion is mixed with 5 kg. of caustic soda dissolved in 200 litres of water, and with a suitable quantity of a protective substance preferably protein. Further 12 kg. of aluminium chloride (AlCl$_3$6H$_2$O) are dissolved in 300 litres of water. The emulsion is now added with stirring into the salt solution, the caustic soda reacting with the aluminium chloride to produce aluminium hydroxide, the excess of aluminium chloride above that required to react with the caustic soda, when using proportions as above given, remaining in the solution and being combined with the dispersion in the presence of the aluminium hydroxide thus formed. This treatment results in the formation of the product I have termed a gel, in which condition the product is unaffected by coagulating influences. The asphalt gel so obtained is immediately ready for use. Therefore it is possible to mix the gel with different substances for instance such containing salts, acids and the like without lumps being formed. The gel may be stored a long time and transported without any harm.

In the above example, a part or all of the sodium hydroxide solution may be added to the aluminium chloride solution before the emulsion is combined therewith.

The above described process may also be carried out continuously.

I claim:

1. A process for the manufacture of a water insoluble organic substance in dispersed condition which comprises incorporating a protective colloid and an electrolyte in an aqueous dispersion of the water insoluble organic substance and subjecting the dispersion to treatment with a second electrolyte, generating in the dispersion a finely divided colloidal substance during the treatment thereof with said second electrolyte.

2. A process for the manufacture of a bituminous substance in dispersed condition which comprises incorporating a protective colloid and an electrolyte in a previously prepared aqueous dispersion of bitumen and subjecting the dispersion to treatment with a second electrolyte, generating in the dispersion a finely divided substance during the treatment thereof with said second electrolyte, said second electrolyte being used in quantities sufficient to provide an excess thereof, above that required to react with the first named electrolyte.

3. A process for the manufacture of a bituminous substance in dispersed condition which comprises subjecting an aqueous dispersion of bitumen, containing an alkaline substance, to treatment with an electrolyte capable of generating in the dispersion a finely divided substance by reaction with said alkaline substance, said electrolyte being used in quantities in excess of that required to react with said alkaline substance.

4. A dispersion product comprising a primary dispersion, said primary dispersion containing a dispersing agent and said dispersion product containing a finely divided substance in addition to said dispersing agent, and the reaction product of an electrolyte with constituents of said primary dispersion in the presence of said finely divided substance, said dispersion product being further characterized by having the dispersed particles homogeneously distributed therein and said particles being of a size substantially identical with that of said primary dispersion.

5. A bituminous dispersion product comprising a primary dispersion of bitumen in water, said primary dispersion containing a dispersing agent, and said dispersion product containing a finely divided substance in addition to said dispersing agent, and the reaction product of an electrolyte with constituents of said primary dispersion in the presence of said finely divided substance, said dispersion product being further characterized by having the dispersed particles homogeneously distributed therein and said particles being of a size substantially identical with that of said primary dispersion.

6. A process of increasing the stability of an aqueous dispersion of water immiscible material which comprises incorporating a relatively small amount of a primary protective colloid and forming in situ a secondary protective colloid in the presence of said primary protective colloid.

7. A process of increasing the stability of an aqueous dispersion of water immiscible material which comprises incorporating a relatively small amount of a primary protective colloid and forming in situ a secondary protective colloid in the presence of said primary protective colloid and by the interaction between soluble electrolytes.

8. A process of increasing the stability of an aqueous dispersion of water immiscible material which comprises incorporating a relatively small amount of a primary protective colloid and forming in situ a secondary protective colloid in the presence of said primary protective colloid by the interaction between soluble electrolytes, said primary protective colloid being present in sufficient quantities to permit the introduction of the electrolyte without breaking the dispersion.

9. A process of increasing the stability of an aqueous dispersion containing protective colloid and an electrolyte which comprises combining said dispersion with an aqueous solution of an electrolyte capable of reacting with the first named electrolyte to form a finely divided precipitate in the dispersion, said second electrolyte yielding polyvalent positive ions and being present in excess of that required to combine with the other electrolyte.

10. A process of increasing the stability of an aqueous dispersion containing protective colloid and an electrolyte which comprises combining said dispersion with an aqueous solution of an electrolyte capable of reacting with the first named electrolyte to form a finely divided precipitate in the dispersion, said second electrolyte yielding polyvalent positive ions.

11. A process of treating a relatively unstable dispersion containing protective colloid and an electrolyte, which comprises adding said dispersion to an aqueous solution of an electrolyte capable of reacting with the first named electrolyte to form a finely divided precipitate in the dispersion, the latter electrolyte being used in quantities in excess of that required to combine with the first named electrolyte.

12. A process of treating a relatively unstable dispersion containing an electrolyte, which comprises adding said dispersion in combination with a finely divided substance to an aqueous solution of an electrolyte capable of reacting with the first named electrolyte to form a finely divided precipitate in the dispersion, the latter electrolyte being used in quantities in excess of that required to combine with the first named electrolyte.

13. A process of treating a relatively unstable dispersion containing protective colloid and an electrolyte, which comprises adding said dispersion under violent agitation to an aqueous solution of an electrolyte capable of reacting with the first named electrolyte to form a finely divided precipitate in the dispersion, the latter electrolyte being used in quantities in excess of that required to combine with the first named electrolyte.

14. A process of treating a relatively unstable dispersion containing an electrolyte and a protective colloid, which comprises combining said dispersion with an aqueous solution of an electrolyte capable of reacting with the first named electrolyte to form a finely divided precipitate in the dispersion, the latter electrolyte being used in quantities in excess of that required to combine with the first named electrolyte.

15. A process of treating a relatively unstable dispersion containing an electrolyte and a protective colloid, which comprises combining said dispersion with an aqueous solution of an electrolyte yielding polyvalent positive ions and capable of reacting with the first named electrolyte to form a finely divided precipitate in the dispersion, the latter electrolyte being present in excess of that required to combine with the first named electrolyte.

16. A process for the manufacture of a water insoluble organic substance in dispersed condition which comprises incorporating a protective colloid in an aqueous dispersion of the water insoluble organic substance containing a soap-like dispersing agent and containing free alkali, and subjecting the dispersion to treatment with an electrolyte capable of reacting with the alkali to form a finely divided precipitate in the dispersion, the latter electrolyte being used in quantities in excess of that required to combine with the alkali.

17. A process for the manufacture of a water insoluble organic substance in a dispersed condition, which comprises incorporating a protective colloid in an aqueous dispersion of the water insoluble organic substance containing a soap-like dispersing agent and containing free alkali, and adding the dispersion to an electrolyte capable of reacting with the alkali to form a finely divided precipitate in the dispersion, the latter electrolyte being used in quantities in excess of that required to combine with the alkali.

18. A process for the manufacture of a water insoluble organic substance in dispersed condition, which comprises incorporating a protective colloid in an aqueous dispersion of the water insoluble organic substance containing a soap-like dispersing agent and containing free alkali, and adding the dispersion to an electrolyte yielding polyvalent positive ions and capable of reacting with the first named electrolyte to form a finely divided precipitate in the dispersion, the latter electrolyte being used in excess of that required to combine with the first named electrolyte.

In testimony whereof I affix my signature.

FRANZ R. MOSER.